Patented Feb. 20, 1940

2,190,843

UNITED STATES PATENT OFFICE 2,190,843

METHOD OF COATING PAPER

Bert C. Miller, Montclair, N. J., assignor to Bert C. Miller, Inc., New York, N. Y., a corporation of New York No Drawing. Application March 20, 1934, Serial No. 716,504

6 Claims. (Cl. 91—70)

Two general methods of coating fabrics have been in vogue for a long time. One involving compositions or materials requiring heat to produce sufficient fluidity and the other requiring volatile solvents. The materials commonly employed in the hot process are wax, asphalt, sulphur and various hydrocarbons. The hot process has the advantage of low cost but the products heretofore resulting are generally inferior to those of the solvent process for many purposes. In the other class of cases various materials have been employed requiring solvents. The solvents being of a penetrating nature carry the other substances into the fabric, thus requiring more of the compound. This process is expensive in that the solvent which constitutes a large part of the composition is either lost or reclaimed by means of expensive apparatus and the process is slow. Many substances such as those of a nitrocellulose character which might form coatings having some desirable characteristics are of course highly objectionable from the standpoint of safety.

An object of this invention is to provide materials and a process or method of application by which there may be provided cheaply, a fabric coating having highly desirable characteristics of appearance, protective qualities and a wide range of utility.

By the term "coating" I mean the application of a film to one or both sides of a porous fabric such as paper or cloth which becomes hard to touch, under ordinary atmospheric conditions, but is at the same time flexible.

By "laminating" I mean the coating or application of a film to one side only of the fabric and then bringing the coated side into contact with another material and by pressure and before the film is set, uniting or binding the two layers permanently together by means of the tacky coating. The laminated fabric may also be externally coated.

Research and experimentation has led to the discovery of compounds which are suitable for the above purposes and which can be applied commercially by means of high speed machinery to produce various valuable coated and laminated products. The formula for the composition will be varied depending upon the characteristics required in the product.

For instance a very desirable high polish coating is formed from a combination of a phthalic anhydride resin, a binder of a chlorinated diphenyl adhesive, a vinyl resin which is compatible with the phthalic anhydride resin to form the desired coating, and a plasticizer such as tricresyl phosphate.

The phthalic anhydride resin is a suitable polybasic acid-polyhydric alcohol resin such as a vegetable phthalic glyceride resin. A suitable equivalent to be used in place of the phthalic anhydride is a toluol-sulfon-amid resin, except that this material tends to make the coat crystalline and needs a large amount of plasticizer.

The vinyl resin compounds include such as vinyl esters of acetic acid or mono-chlor-acetic acid, vinyl acetate, vinyl chlorid etc. Polystyrol resins may be used as an equivalent of the vinyl resins. The plasticizer may be a phthalic acid salt of benzine di-carboxylic acid. The above ingredients combined in the proportions of 40% of the phthalic anhydride glyceride resin, 30% of the chlorinated diphenyl, 15% of vinyl resin, and 15% of a phthalate plasticizer produce a hard flexible coating with a very high gloss or polish.

The phthalic anhydride glyceride resin should occur in amounts sufficient to give the coat the desired high polish and grease repellant character. If this material were used in too large an amount without a corresponding increase in amount of plasticizer it would make the coat more brittle. The percentage by weight of such material may vary from about 20 to 40 and more and even as high as 70 in some cases.

The vinyl resin must be one which is compatible with the phthalic anhydride to form a balanced solution for the desired coating. It is the vinyl which gives the coat its elasticity and flexibility, with hardness to the touch. Being the most expensive ingredient in the coat it is used in no more than the necessary amount preferably between about 10% to 15%. If larger amounts are used the coat becomes softer at a lower temperature, whereas smaller quantities reduce the flexibility of the coat and make it softer to the touch.

The plasticizer enhances the flexibility of the coat making it better adapted to folding and non-cracking, although it may be omitted as not an absolute essential of the coat.

The adhesive is used in amounts between about 10 to 30%. Too little of the adhesive reduces the bond between the coat and foundation making the coat tend to crack off while a larger amount makes the coat sticky.

In making up the coating material, the various ingredients with the exception of the adhesive which is added later, are thoroughly mixed for a number of hours under an elevated temperature below 300° F. in order to get a uniform material best adapted to provide the kind of coating desired. To get good results the vinyl resin may be added slowly to the phthalic anhydride glyceride resin, the adhesive being added later. After this treatment the material may be cooled for coating later, or the hot material may be applied to the paper web or other foundation at about 300° F. At this temperature the material is sufficiently plastic and pasty to enable it to be applied to the paper with the rolls of an ordinary machine for coating paper. A difference in this machine resides in a provision of a smoothing bar which is heated to a temperature preferably above that to which the material is heated so that there will be no danger of the material being carried off by the smoothing bar as occurs in smoothing a coating rendered fluent by a solvent.

The same ingredients with a smaller proportion of the synthetic resin and a greater proportion of the binder and the plasticizer forms an excellent greaseproof adhesive suitable for a laminated fabric. It is desirable to lower the cost of the adhesive by adding a filler such as phenol formaldehyde, with proportions of 20% synthetic resin, 10% of the binder, 10% of the vinyl compound, 30% of the plasticizer and 30% of the phenol formaldehyde resin. Other fillers may also be used.

If a laminated fabric is to be made the composition is suitably modified as above pointed out and applied in the same manner and the additional sheet or web is then applied to the coated surface and the two layers are pressed together under heat sufficient to soften the composition.

These fabrics can be made very economically and at high speed by simple machinery. The expense and annoyance of solvents is avoided and the coating will be much more highly polished than a coating from which a solvent has been evaporated.

As there is practically no impregnation of the paper web fibres, no material is lost. The finished product is quite flexible and is resistant to grease.

A fabric coated as herein specified may be used for various purposes. In fact it may be rolled up and stored for subsequent use in making packages to be sealed by the application of heat.

As used herein the term coating is broad enough to include the material between the fibrous webs of a laminated fabric.

Under this invention the coated paper may be made about 60% cheaper than can similar appearing coated papers made by using solvents. This saving is not all due to the elimination of the solvent, and the time, and apparatus for drying, but is also due to the ability to coat paper to a desired thickness by one trip through a machine whereas the nitrocellulose containing coatings need repeated trips through the coating machine to build up the desired coating.

A paper coated according to this invention is to be distinguished from papers having similar appearing coatings applied with the aid of solvents. With solvent coatings the paper web fibers are impregnated generally substantially more than in the present case when substantially no impregnation occurs. The coat is applied around the fibers but not into them as the mass is somewhat pasty or gummy when applied and the adhesive holds the coat onto the fibers. Another difference could be noted by a skilled artisan. The surface of the coating when applied on paper according to the teachings of this invention does not necessarily follow the surface contour of the paper and contains fine markings due to the surface of the smoothing bar, even though such bar be chromium plated and polished.

After the smoothing operation the coat of this invention cools almost immediately. In solvent coatings the coat is fluent for several minutes after treatment with the smoothing bar and any faint scratch on the smoothing bar has less effect due to the greater fluidity of the solvent coating being applied. Also where solvent coatings are used some nitrocellulose material is generally embodied which results in the paper being more combustible, less highly polished than is true of the paper coated according to this invention. Nitrocellulose in solvent coatings tends to dull the high polish that would otherwise be present.

While the compositions herein described produce a product that is waterproof it is not entirely moisture proof, i. e., capable of excluding moisture from whatever may be wrapped in it.

In all commercial processes for paper the coat is generally applied to a foundation which is substantially continuously and relatively moving, as distinguished from the high temperature and pressure molding of phenolic condensation products.

Beside having a flexibility for some uses which is sufficient to prevent cracking when the paper is folded, a more general need for flexibility is to permit the coated paper to be wound up on a roll without cracking as it comes from the surfacing machine, such wind-up rolls being generally found on paper coating machines.

The combination of surface hardness with flexibility makes this coating unusual in coatings which are largely resinous and in coatings which are adapted to be applied without a solvent.

I claim:

1. The process for providing a highly polished thin flexible surface film firmly attached to a paper base free from impregnation by the material composing the film which comprises providing a melt of a composite resin solid at normal temperatures consisting essentially of a resin selected from the group consisting of a polybasic acid-polyhydric alcohol resin and toluol-sulfonamide resin, chlorinated diphenyl, a vinyl resin and a plasticizer, applying the molten composite resin to a surface of the base at a temperature of not substantially exceeding about three hundred degrees Fahrenheit to form a thin flexible surface film of substantially the same composition as the melt which solidifies solely by cooling and drawing the coated base over a smooth surface heated to about the temperature of the resin at application to provide a film of solidified resin attached to the base by application around the fibres but not into them.

2. The process for providing a highly polished thin flexible surface film firmly attached to a paper base free from impregnation by the material composing the film which comprises providing a melt of a composite resin solid at normal temperatures consisting essentially of a resin selected from the group consisting of a polybasic acid-polyhydric alcohol resin and toluol-sulfonamide resin, chlorinated diphenyl, a vinyl resin and a plasticizer, applying the molten composite resin to a surface of the base at a temperature of not substantially exceeding about three hundred degrees Fahrenheit to form a thin flexible surface film of substantially the same composition as the melt which solidifies solely by cooling and after partial solidification of the film smoothing the surface of the coating by drawing the coated base over the surface of a member heated to approximately the temperature of the melt to provide a film of solidified resin attached to the base by application around the fibres but not into them.

3. The process for providing a highly polished thin flexible surface film firmly attached to a porous flexible base free from impregnation by the material composing the film which comprises providing a melt of a composite resin solid at normal temperatures consisting essentially of a resin selected from the group consisting of a polybasic acid-polyhydric alcohol resin and toluol-sulfonamide resin, chlorinated diphenyl, a vinyl resin and a plasticizer, applying the composite resin to a surface of the flexible base at a temperature of not substantially exceeding about three hundred degrees Fahrenheit to form a thin flexible surface film of substantially the same composition as the melt which solidifies solely by cooling and smoothing the surface of the coating by drawing the coated base over the surface of a member heated to approximately the temperature of the melt.

4. A porous flexible sheet at least one side of which has a flexible waterproof synthetic resin coating of a composite resin solid at normal temperatures comprising a polybasic acid-polyhydric alcohol resin, chlorinated diphenyl, a vinyl resin and a plasticizer with a high gloss, hard smooth finish independent of minor variations in the surface of the sheet strictly confined to the surface of the porous flexible sheet as produced by the process of claim 1.

5. The process for providing a highly polished thin flexible surface film firmly attached to a paper base free from impregnation by the material composing the film which comprises providing a melt of a composite resin solid at normal temperatures, applying the molten composite resin to a surface of the paper base at a temperature of not substantially exceeding about three hundred degrees Fahrenheit to form a thin flexible surface layer of substantially the same composition as the melt which solidifies solely by cooling and drawing the coated base over a smooth surface heated to about the temperature of the resin at application to provide a film of solidified resin attached to the base by application around the fibres but not into them.

6. A porous flexible sheet at least one side of which has a flexible waterproof coating of a composite resin solid at normal temperatures with a high gloss, hard smooth finish independent of minor variations in the surface of the sheet strictly confined to the surface of the porous flexible sheet as produced by the process of claim 5.

BERT C. MILLER.

CERTIFICATE OF CORRECTION.

Patent No. 2,190,843. February 20, 1940.

BERT C. MILLER.

It is hereby certified that error appears in the printed specification of the above numbered patent requiring correction as follows: Page 2, first column, line 12, for "a provision" read the provision; page 3, first column, line 10, claim 3, for "porous flexible" read paper; line 17, after "the" insert molten; line 18, strike out the word "flexible"; and line 26, same claim 3, after "melt" and before the period, insert the words to provide a film of solidified resin attached to the base by application around the fibers but not into them; and that the said Letters Patent should be read with this correction therein that the same may conform to the record of the case in the Patent Office.

Signed and sealed this 2nd day of April, A. D. 1940.

(Seal)

Henry Van Arsdale,
Acting Commissioner of Patents.